United States Patent
Clikeman et al.

(10) Patent No.: US 6,919,981 B2
(45) Date of Patent: Jul. 19, 2005

(54) DEVICE HAVING REFLECTIVE AND TRANSMISSIVE PROPERTIES

(75) Inventors: Richard W. Clikeman, Austin, TX (US); Neil D. Lubart, Austin, TX (US); Charles Ronald Mayfield, Cedar Park, TX (US)

(73) Assignee: Trivium Technologies, Inc., Cleveland, OH (US)

( * ) Notice: Subject to any disclaimer, the term of this patent is extended or adjusted under 35 U.S.C. 154(b) by 0 days.

(21) Appl. No.: 10/990,102

(22) Filed: Nov. 16, 2004

(65) Prior Publication Data

US 2005/0088717 A1 Apr. 28, 2005

Related U.S. Application Data

(63) Continuation of application No. 10/282,702, filed on Oct. 29, 2002, now Pat. No. 6,819,465, which is a continuation of application No. 09/491,450, filed on Jan. 26, 2000, now Pat. No. 6,473,220, which is a continuation-in-part of application No. 09/234,522, filed on Jan. 21, 1999, now abandoned.

(60) Provisional application No. 60/072,202, filed on Jan. 22, 1998.

(51) Int. Cl.$^7$ .............................................. G02F 1/03
(52) U.S. Cl. ..................................... 359/247; 359/245
(58) Field of Search ............................... 359/247, 245, 359/252, 253, 237

(56) References Cited

U.S. PATENT DOCUMENTS 6,010,747 A * 1/2000 Beeson et al. ............... 427/162
6,011,601 A * 1/2000 Kojima ......................... 349/62

* cited by examiner

*Primary Examiner*—Hung Xuan Dang
(74) *Attorney, Agent, or Firm*—Benesch, Friedlander, Coplan & Aronoff LLP

(57) ABSTRACT

A device which simultaneously maximizes light reflectivity from one side of the device while maximizing light tansmmissivity from the opposite side of the device. The device is configured with distinct regions of transparency and reflectivity including a plurality of reflective structures. The structures generally smaller towards a light transmitting side of the device and larger towards a light reflective side of the device.

15 Claims, 5 Drawing Sheets

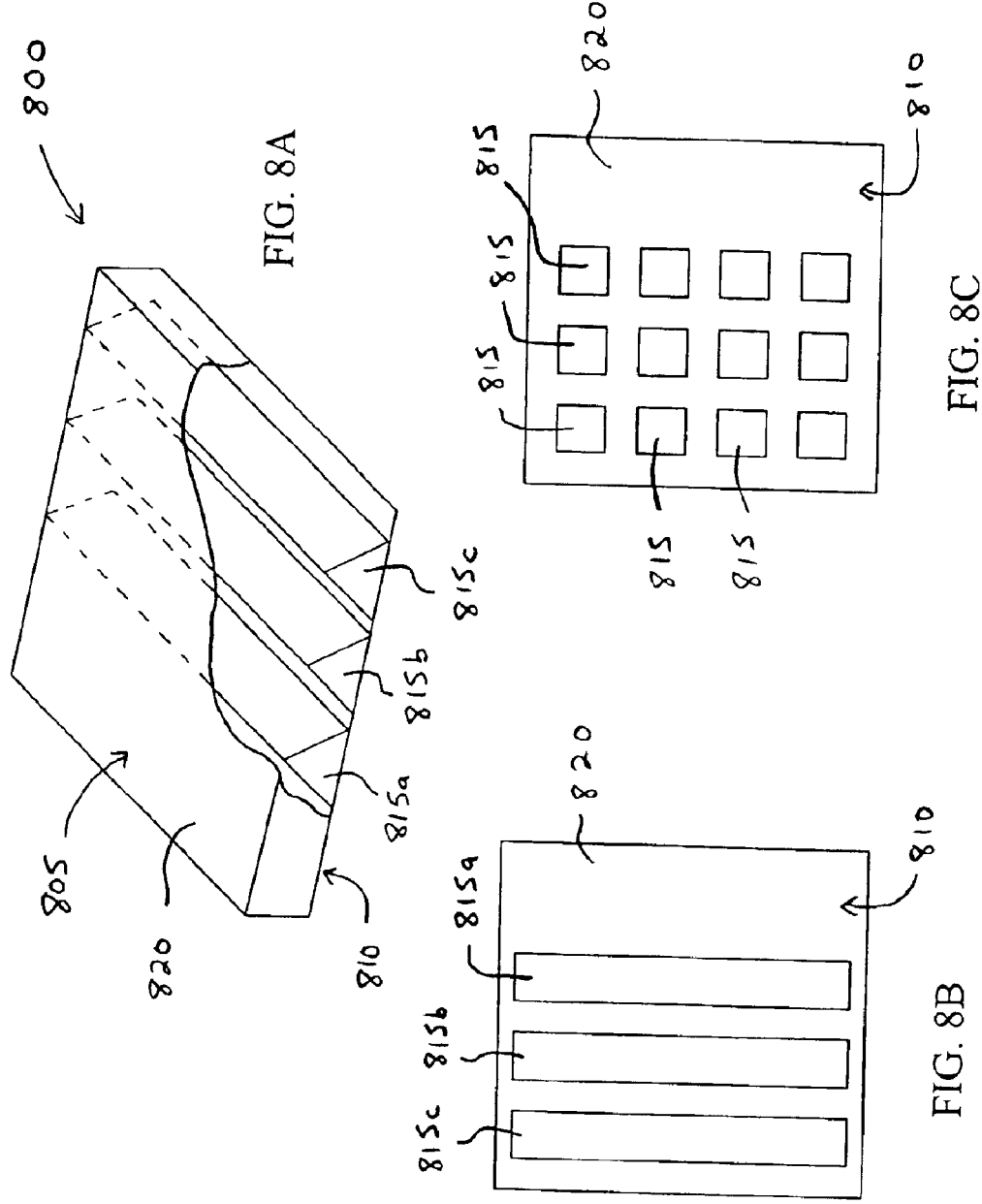

DEVICE HAVING REFLECTIVE AND TRANSMISSIVE PROPERTIES

CROSS REFERENCE TO RELATED APPLICATIONS

This application is a continuation of U.S. application Ser. No. 10/282,702 filed on Oct. 29, 2002, now U.S. Pat. No. 6,819,465, which is a continuation of U.S. application No. 09/491,450 filed Jan. 26, 2000, now U.S. Pat. No. 6,473,220, which is incorporated by reference herein, which is a continuation-in-part of U.S. application Ser. No. 09/234,522 filed Jan. 21, 1999, now abandoned, which claims the benefit of Provisional Application No. 60/072,202 filed Jan. 22, 1998.

BACKGROUND

The prior art for non-emissive displays, particularly liquid crystal displays, include either reflective displays or surface light source (transmissive) displays, commonly denoted backlit displays. The conventional reflective display which uses a reflective film as the bottom layer to redirect ambient light back through the display elements has a composition as illustrated in FIG. 1. In this drawing ambient light 10 (sunlight, artificial light—such as office lighting—or from a light source 11 attached to the top of the unit) enters the display unit, passes through the various layers of the unit, 6 polarizers, 7 glass plates (which may include color filters, common electrodes, TFT matrix, or other components), and 8 liquid crystal suspension, and is redirected from the reflective film 9 back through the various layers to produce an image. This method of creating an image with available ambient light is limited by the available light. This method is not an effective means for producing high quality graphic images and severely limits the quality of color images in a variety of conditions. The conventional backlit (transmissive) display has a composition as illustrated in FIG. 2. In this drawing, light is produced with a backlight assembly 12 and directed as light ray 13, through the various layers, such as 6 polarizers, 7 glass plates (which may include color filters, common electrodes, TFT matrix, or other components), and 8 liquid crystal suspension, to produce an image.

Previous attempts to use simultaneously the ambient light and a backlight have resulted in applications that compromise both the transmissive qualities and the reflective qualities of the display. Hochstrate, in U.S. Pat. No. 4,196,973 teaches the use of a transflector for this purpose. Weber, in U.S. Pat. No. 5,686,979, col. 2, teaches the limitations of the transflector for this purpose and alternatively proposes a switchable window that at one time is wholly transmissive and at another time is wholly reflective.

BRIEF DESCRIPTION OF THE DRAWINGS

FIG. 8A shows a perspective view of one embodiment of a device having reflective and transmissive properties.

FIG. 8B shows a bottom view of FIG. 8A.

FIG. 8C shows another embodiment of a bottom view of FIG. 8A.

Reference Numerals in FIGS. 1–7

Figure 1:
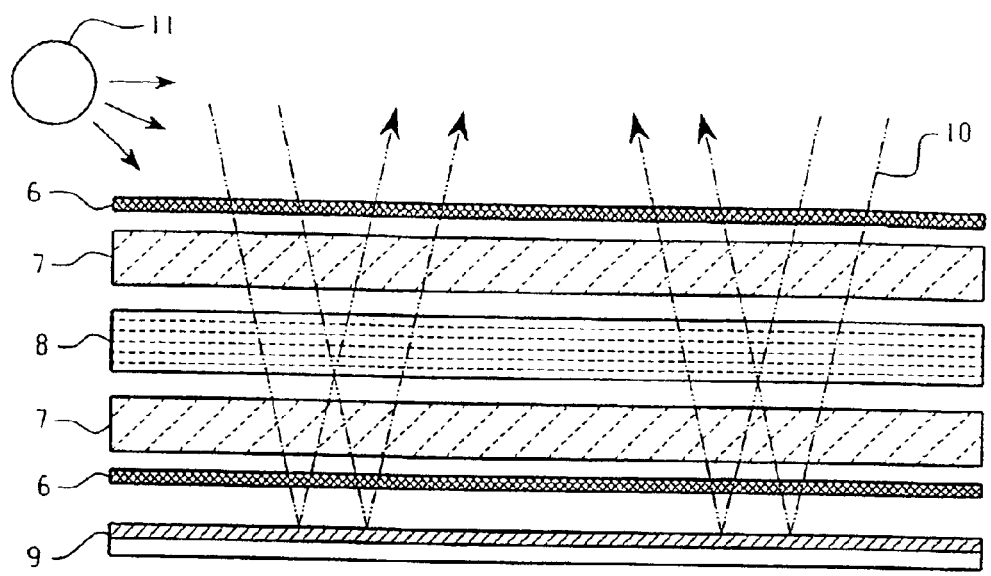
FIG. 1 (prior art) is a diagram showing the operation of a conventional reflective display.
Figure 2:
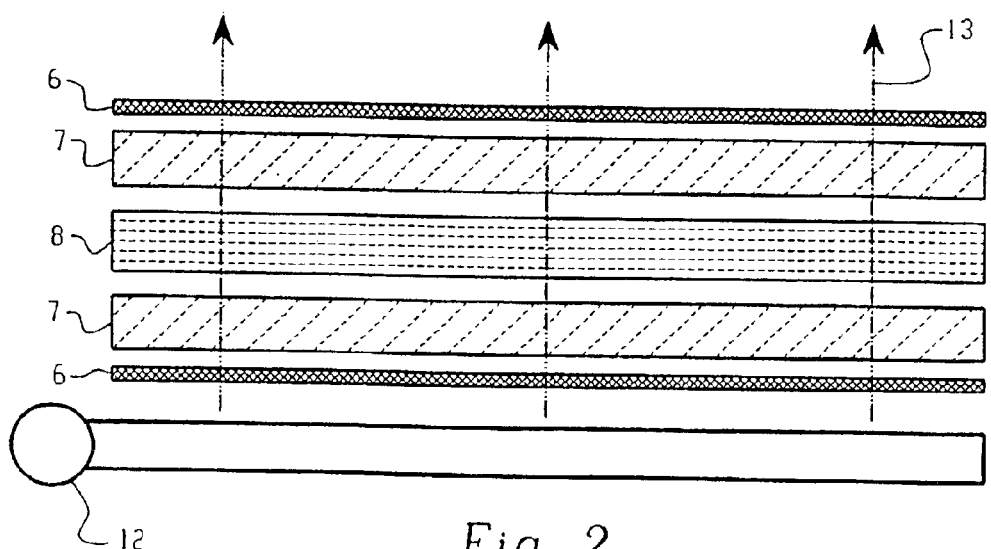
FIG. 2 (prior art) is a diagram showing the operation of a conventional backlight display.

6 polarizers
7 glass plates
8 liquid crystal suspension
9 reflective film
10 ambient light from sun or room
10A light ray striking absorber directly
10B light ray strikes absorber directly, is reflected off absorber, is reflected off base of reflective structure back to absorber, etc.
10C light ray strikes side of reflective structure and is directed to absorber, is reflected off absorber, is reflected by base of reflective structure back to absorber, etc.
11 controllable source of light from exterior of display
12 backlight assembly
13 light ray from backlight assembly
14 transparent material of the device
15 reflective material of the device
16 remainder of the non-emissive display system
17 base of the reflective structure
18 spacing between reflective structures at the base
19 thickness of the device
20 height of the reflecting structure from base to apex
21 the number of reflecting structures per pel (picture element of display)
22 device in cross-section
23 the sun
24 absorbing material in a solar collector
31 transparent material
32 reflective/refractive shapes
33 a reflective material
34 collimator
35 light ray
36 light ray
37 light ray
41 boundary edge of the device
42 body of the device
43 structures
44 light ray
45 light ray
46 light ray
47 light ray
48 light ray
49 light ray

DETAILED DESCRIPTION OF THE INVENTION

Generally, the device described herein, which will be described in greater detail below, has reflective and transmissive properties such that R+T>1. The device may be used in any and all applications where there is a requirement in which reflectivity of incident energy or light (visible through infrared) coming from a first direction and transmissivity of energy or light coming from the opposite direction are simultaneously enhanced. That is, the sum of the reflectivity from the first direction and the transmissivity from the opposite direction exceeds 1.0 as shown in one embodiment above. The device may be referred to as a multiflector or a transflector that is capable of simultaneously transmitting and reflecting light such that R+T>1.

One application area for the device is for solar collection in which transmission of light would be maximized (reflectivity minimized) in the direction facing the sun and reflectivity maximized (transmissivity minimized) in the direction facing the collector. The device should increase the level of retained energy in such devices. Additionally, the device could be used as part of a heating, cooling and/or power generating system in which solar energy is utilized for some or all of the power generation. The device should increase the efficiency of solar collectors and will thus reduce the use of fossil fuels.

The term "light", as used herein, encompasses electromagnetic radiation with wavelengths corresponding to visible through infrared. The device, however, can be formed to be applicable to any electromagnetic radiation that is capable of being reflected or refracted, subject to the ability to create structures of a size and a material to do so. Specifically, embodiments of the device can find applicability in the radio, radar, microwave, infrared, visible, ultraviolet, x-ray and gamma forms of radiation.

Another application area includes use with any non-emissive display technology—such as electrochromic, ferroelectric, ferromagnetic, electromagnetic, and liquid crystal—where it is desired to use both externally generated (ambient) light and internally generated (artificial) light. The device may be a replacement for the transflective/reflective/transmissive element of the non-emissive displays, where the replaced element is either independent of or integral to the internally generated light (backlight system). Use of this device should allow brightness contributions simultaneously from artificial light and ambient light such that systems will see a significant decrease in power usage. In system where a battery is used for some or all of the power supply, battery life can be increased.

Another application area includes building materials in which the device can be used to direct light from a light source (such as a window or skylight) while at the same time reflecting ambient light within a building or structure. It will be appreciated that other applications exist where light is desired to be controlled or required.

In one embodiment, the device may take the forrn of a film that may be designed as an integral element of a system or product in which it is a part. The film includes a transparent body containing a set of indentations, or discrete shapes, which may be filled with reflective material(s). The indentations may be configured to have a variety of cross-section shapes such as a triangle or other polygon which may be arranged in a variety of patterns. The indentations may be replaced by a series of discrete objects such as pyramids, cones, or any polyhedron, and likewise may be arranged in a variety of patterns. The discrete faces of the indentations or objects may be planar, concave, convex, or pitted such that light reflecting from any face may be controlled. The preferred material for filling the indentations is a material with high reflectivity such as aluminum or silver, but may be a composite paste, a composite material, or multiple materials with different refractive indices or reflective qualities. In one embodiment, the reflective material is embedded in the transparent material such that the base of each shape is approximately parallel to and coincident with, or slightly recessed from the transparent material. The indentations, or discrete objects, may be repeated in parallel and spaced across the area of the film. The indentations, or discrete objects, may be arranged in varying shapes, heights, angles, or spacings before a pattern is repeated, or may be randomly distributed.

Figure 3:
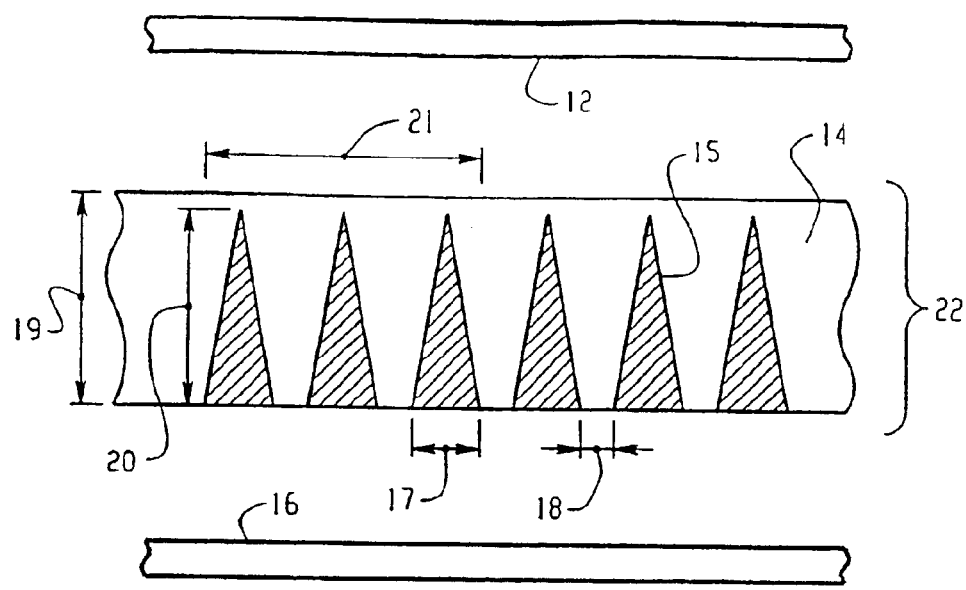
FIG. 3 is a diagram showing one example of a backlight embodiment incorporating a device having reflective and transmissive properties.

In FIG. 3, let 14 represent the transparent material, 15 represent light directing/funneling structures and/or microstructures such as reflective indentations or objects, 12 represent the backlight assembly, and 16 represent the remainder of the non-emissive display system and the direction from which the display is viewed. Let:

17=r=half width of base of the groove, or object
2r=base of groove, or object
f=multiple of the half width of base of the groove
18=fr=spacing between indentations
19=Th=film thickness (based on the height of the groove, or object, and is determined by the nature of the transparent material)
K=multiple of the half-width of base of the groove
20=Kr=height of groove, or object
21=M=number of indentations per pel (picture element) defined here as the smallest controllable area of the display Also let
$R_{M2}$=reflectance of the reflective material to normally incident light
22 represent one embodiment of the film Mirror-like and funnel effects can be accomplished by using a combination of appropriate (1) shaping of the material comprising the film and (2) choice of materials with either different reflectivities, indices of refraction, composites, or a combination of these. The light directing/funneling structures and/or microstructures 15 may be formed from a variety of structures which may include, but are not limited to indentations (intersecting or not), cones or other conic sections, multi-sided structures (regular or not) such as pyramids or tetrahedrons, all structures of the same or different sizes generally varied periodically and in which the reflectance, transmittance, and absorption of the film might have different values. This enables the achievement of high reflectivity and low transmissivity through the film in one direction and high transmissivity and low reflectivity in the other direction.

$R_1$=reflectivity from one side
$T_1$=transmissivity from one side
$A_1$=absorptivity from one side
$R_2$=reflectivity from the other side
$T_2$=transmissivity from the other side
$A_2$=absorptive from the other side From the conservation of energy: $R_1+T_1+A_1=1$ and $R_2+T_2+A_2=1$. In the prior art of transflectors, $R=R_1=R_2$; $T=T_1=T_2$; and $A=A_1=A_2$. It follows that in the prior designs, R+T=1 when A=0. Even where prior art claims to overcome the limit of transflectors and where the disclosed transflector is meant to channel or direct light, no overall transmitance or reflectance is shown so that any possible gain cannot be determined and is not apparent.

In this art, the value of the reflectance on one side of the film is significantly decoupled from the value of the reflectance on the other side, and the value of the transmissivity on one side is significantly decoupled from the value of the transmissivity on the other side. This newly disclosed film allows $R_1 \neq R_2$, $T_1 \neq T_2$, and $A_1 \neq A_2$. A specific embodiment will be shown below in which $T_1$, $R_2$, $A_1$, and $A_2$ are small. It follows that $R_1+T_2>1$. This disclosed film multiplies the transflecting effect. In the theoretical limit, for this non-emissive version of the film, $T_1=R_2=A_1=A_2=0$. Then $R_1+T_2=2$.

Figure 4:
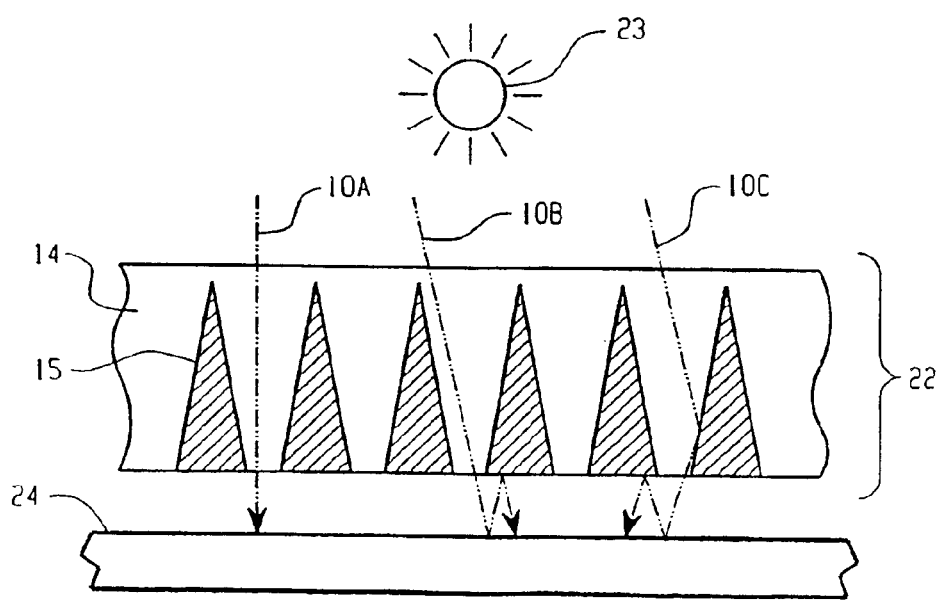
FIG. 4 is a diagram showing one example of a solar panel embodiment incorporating a device having reflective and transmissive properties.

The first embodiment of the film is related to uses in which light is to be directed without regard to dispersion upon transmission, in particular for use in solar collectors or any device in which radiated light is to be directed or collected as illustrated in FIG. 4. In this drawing light from the sun 23 enters the transparent material 14 as light ray 10A and is transmitted directly to an absorbing material 24. Light ray 10B passes through the transparent material 14 and is partially reflected by the absorbing material 24. Light ray 10C passes through the transparent material 14 and is redirected by the reflecting structure 15 to the absorbing material 24, is partially reflected by the absorbing material 24. The film material will be highly optically transmissive to visible, ultraviolet, and/or near infrared light between about 300–2,500 nanometers, stable to ultraviolet light, impervious to moisture, non-hygroscopic, scratch resistant, and easy to keep clean, with an appropriately chosen refractive index to match the other elements of the system in which it is a part. If adhesive is used to adhere the film 22 to another substrate, the adhesive should be highly optically transmissive to light between about 300–2,500 nanometers and stable to ultraviolet light. In the first embodiment, the design is for maximum sum of transmissivity and reflectivity. Then maximum sunlight will be collected and retained within the specific device in which the film is a part. Therefore, for this embodiment, let $R_{M2}=1.00$; a perfectly reflecting material. Let f=0.1, the practical limit for manufacturability of the indentations. Choose values for r and f large enough to avoid diffraction and interference effects. For example, choose $r=200\Phi$ so that the spacing between adjacent indentations at the base is $20\Phi$, well above the longest wavelength of visible light. For a solar collector where multiple reflections during transmission are insignificant as long as perfectly reflecting material is used, $R_1=2/(2+f)=0.952$ and $T_2=1.000$. Thus, $R_1+T_2=1.952$, near the theoretical limit of 2.000. Thus, virtually all light energy entering the system will be trapped.

A second embodiment of the device is related to use with a non-emissive display system, such as liquid crystal displays, or other devices in which light is directed for the purpose of creating an image. Once again, the device may take the form of a film 22. In this embodiment, the film 22 may be inserted between the backlight assembly and the remainder of the display system, may be a component of the backlight assembly, or may be attached to a component of the remainder of the display. One example of an artificial light source in this case would include a means of collimating light such that a majority of light emerges perpendicular to the film 22. The highly transmissive side of the film 22 faces the backlight system and the highly reflective side faces the viewer. The film will cover the full area of the display. The indentations or objects may be arranged at any angle to the edge of the display, from parallel to oblique.

Figure 5:
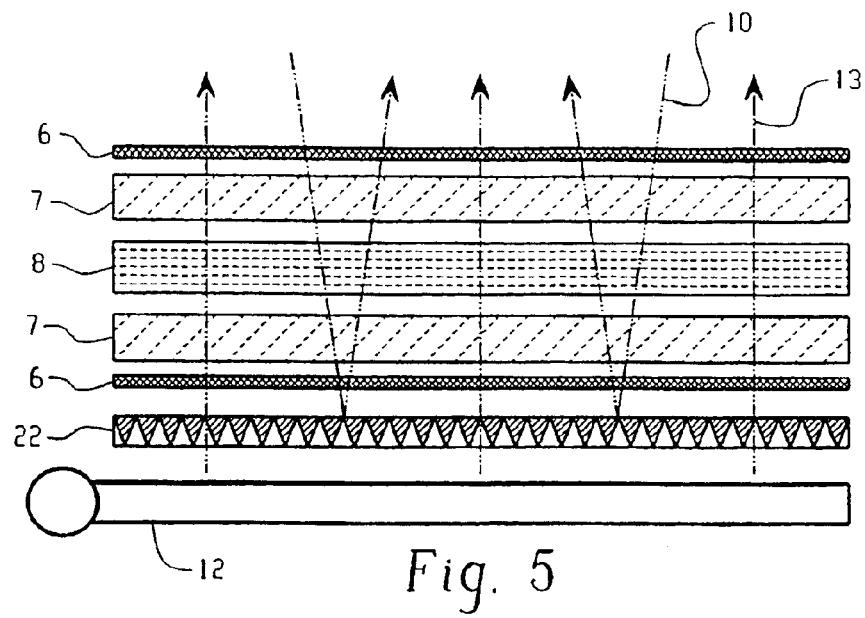
FIG. 5 is a diagram showing one embodiment of a non-emissive display incorporating a device having reflective and transmissive properties.

One embodiment of a non-emissive display system including an embodiment of the film 22 is illustrated in FIG. 5. In this drawing, ambient light 10 will pass through the various layers 6 polarizers, 7 glass plates (which may include color filters, common electrodes, TFT matrix, or other components), and 8 liquid crystal suspension and will be redirected by the reflective elements of the film 22, back through the various layers 6 through 8, while at the same time artificial light rays 13 generated from backlight assembly 12 will pass through the transparent elements of the film 22 which may be attached to adjacent elements such as backlight assembly 12 or be installed as a separate layer in the display system. It will be appreciated that different types of layers may be used rather than layers 6–8, additional layers may be included for desired effects, and the positioning of the film 22 or other layers may be changed.

Let
  $W_T$=width of the display
  m=number of indentations per pel (picture element) defined here as the smallest controllable area of the display
  $F_W$=format of display in horizontal direction (number of distinct elements, where each element has a red, green, and blue pel)

Then $r=W_T/[3 F_W m (2+f)]$ for a color liquid crystal display. To illustrate one example method of design, let $W_T=246$ mm and $F_W=800$ represent the typical values for a vintage 1996/97 color liquid crystal display design. Also, let m=3 to eliminate the necessity of alignment of the film 22 with the pels of the display during the display assembly process. Additionally, m may be increased or decreased as necessary to eliminate visible non-uniformities in the light distribution, such as banding, which may be created by the film 22.

For the designs shown for the second embodiment, let f=0.5. This minimizes the redirection of light, preserving the original direction of the transmitted light. For this value of f, 20% of parallel light from the backlight system will be transmitted without reflection, 40% will be transmitted with one redirection from the reflecting indentations or objects, and. 40% will be transmitted after two redirections from the reflecting indentations or objects. In this instance r can be calculated using the equation $r=W_T/[3 F_W m (2+f)]$ to be 13.7$\Phi$ with a spacing fr (spacing between indentations) of 6.9$\Phi$. The reflectance $R_1$ and transmittance $T_2$ can be computed if $R_{M2}$ (normal reflectance of the material) is known. Note two design examples:
1. Let $R_{M2}=1$, then $R_1=2/(2+f)=0.8$. and $T_2=1.0$, resulting in $R_1+T_2=1.8$.
2. Let $R_{M2}=0.86$, then $R_1=2 R_{M2}/(2+f)=0.688$. and $T_2=0.840$, resulting in $R_1+T_2=1.528$.

Both designs show an improvement available from use of the film 22.

Figure 6:
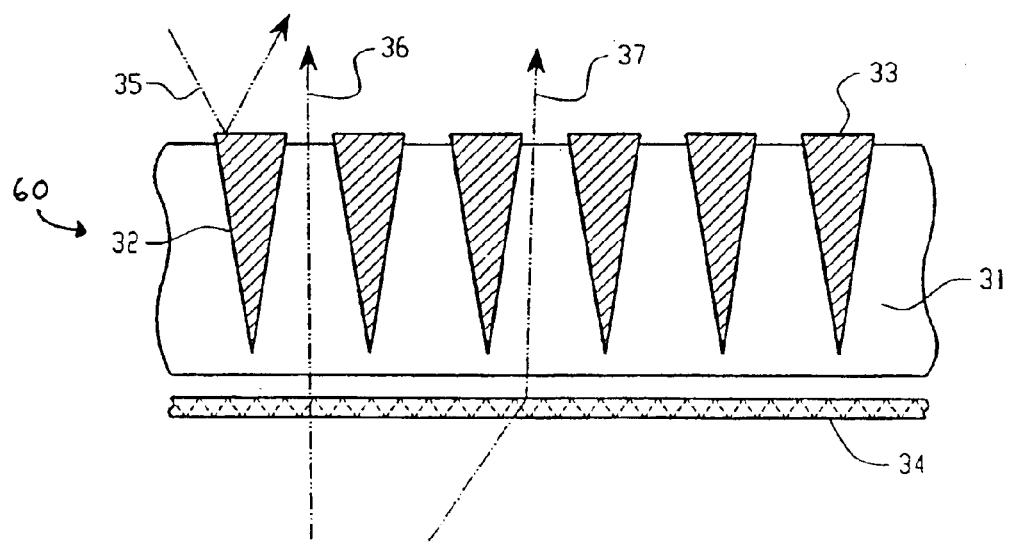
FIG. 6 is a diagram showing another embodiment incorporating a device having reflective and transmissive properties.

Another embodiment is shown in FIG. 6. Let 31 represent the transparent material (body of the device 60), 32 represent the reflective/refractive shapes, 33 represent a reflective material (where no fill, gas, vacuum, or a change of indices of refraction are used to create structures), and 34 represents a collimating element attached to the device 60. Light ray 35 strikes the base of a shape 32 and is redirected away from the device 60 (reflected). Light ray 36 enters the device 60 from a transmissive energy source (not shown), passes through the collimator 34 without redirection, passes through the transparent body 31 of the device 60 without striking any shaped structures 32 and exits the reflecting side of the device 60 without redirection. Light ray 37 enters the collimator from a transmissive energy source (not shown) at an incident angle for example greater than 10 degrees, and is redirected by the collimator 34 to less than 10 degrees. Light ray 37 enters the transparent body 31 of the device 60 and passes through without being redirected.

Figure 7:
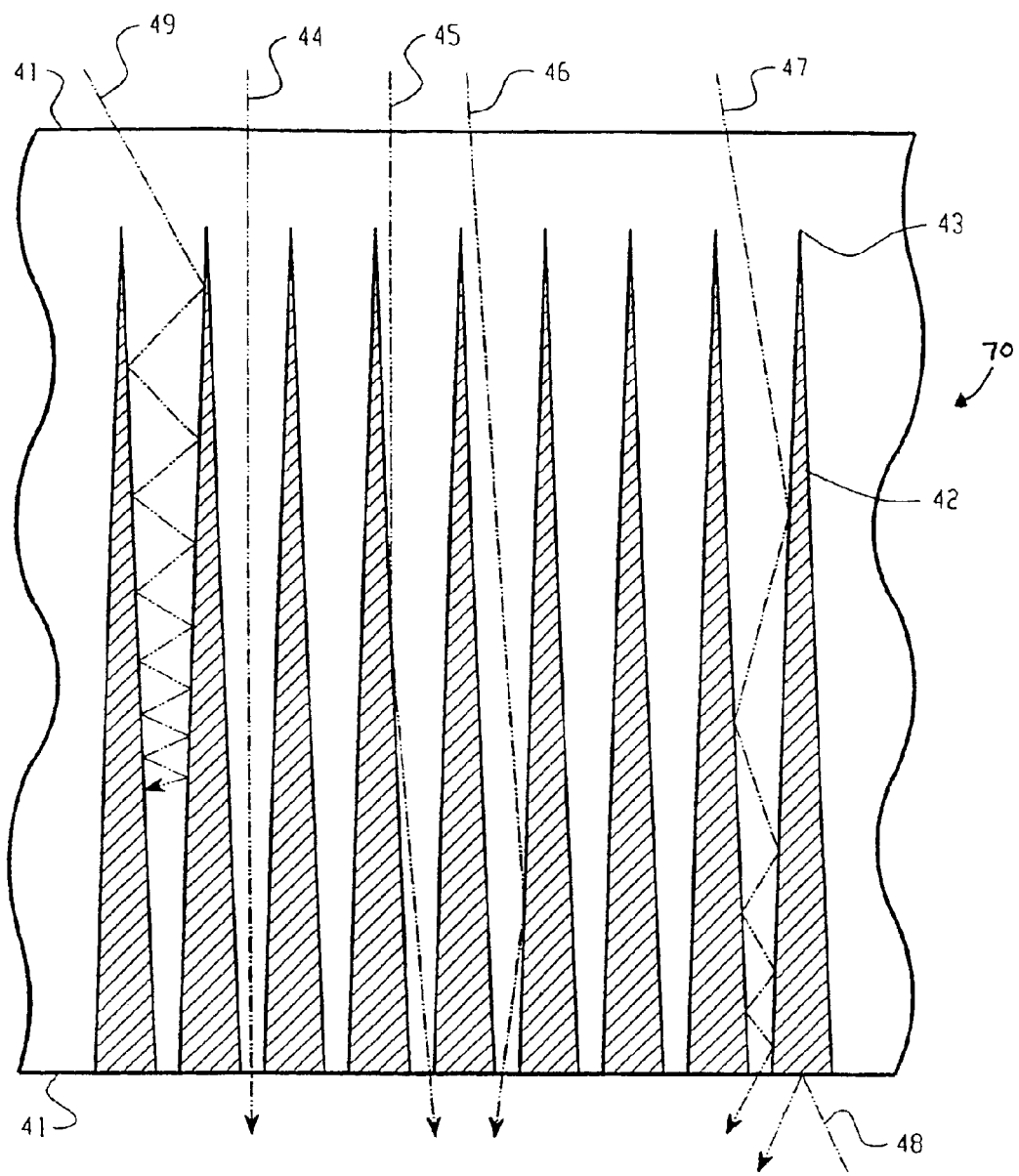
FIG. 7 is a diagram showing a cross section of another embodiment incorporating a device having re and associated light paths.

FIG. 7 represents a cross section of another embodiment of the device 70, where 41 represents the boundary edge of the device 70. One or more structures 42 extend into the device 70 a percentage of the total device 70 thickness. As used in this patent, the term "structure" refers to the shape of the device refracting or reflecting light. The structure may be a physically separate item mounted on or in the light transmittive material, it may be formed or represent a groove or indentation that has been cut into the light transmissive material, or it may be the end result of treatment of portions of the light transmissive material such that a shape having a different index of refraction is formed. Where the transmissive material is a gas or vacuum, as may be found in solar applications, the structure is mounted "in" the material by means of a grid, wire, filament or other such device, with the grid representing a surface of the transflector.

Let the apex 43 (tip) of structure 42 have an angle of 4 degrees. Additionally, let the apex 43 of structure 42 face one light source (not shown) while the base of the structure 42 faces another light source (not shown). Light ray 44 enters the device 70 perpendicular to the plane of the device 70 and passes through the device 70 without striking a shaped structure 42 and exits the device 70 without redirection. Light ray 45 enters the device 70 perpendicular to the plane of the device 70 and strikes the midpoint of a structure 42 and is minimally redirected (4 degrees relative to perpendicular to the plane of the device 70) such that it exits the device 70 without striking an adjacent structure 42. Light ray 46 enters the device 70 perpendicular to the plane of device 70 and strikes a structure 42 near the apex 43 (tip) and is minimally redirected (4 degrees relative to perpendicular to the plane of the device 70) such that it strikes an adjacent structure near the base of the structure (16.6% of the height of the structure) and is again minimally redirected (as above) such that the total redirection of light ray 46 is 8 degrees from the perpendicular to the plane of the device 70 upon exiting the device 70. Light ray 47 enters the device 70 at an angle greater than 10 degrees of perpendicular to the plane of the device 70 and strikes a structure 42 above the midpoint and is minimally redirected (4 degrees relative to perpendicular to the plane of the device 70). Due to the increased angle of entry of light ray 47, multiple redirections occur before light ray 47 exits the device 70. In this example, seven redirections are necessary for light ray 47 to exit the device 70—the cumulative redirection is 28 degrees. Light ray 48 is reflected by a structure 42 at an angle equal to the angle of incidence. Light ray 49 enters the device 70 at a steep angle relative to the perpendicular to the plane and strikes a structure 42 near the apex (tip), due to the cumulative redirection light ray 49 cannot exit the opposite side of the device 70.

The multiflector shown in FIG. 7 is configured with structures 42 at an aspect ratio of 14.3, a spacing between structures 42 of 25% of the base width, and structures evenly spaced across the body of the device 70. Such a device 70 will produce a transmissivity of 94% of light rays entering the device 70 perpendicular to the plane from the side closest to the apex (tip) of structures 43 (transmissive side). The device 70 described above will provide the additional benefit of reflecting 76% of light striking the device 70 from the opposite direction. In this example, 20% of light entering from the transmissive side will pass through the device 70 without redirection, 40% will pass through with a single redirection (4 degrees relative to perpendicular to the plane of the device 70) and 40% of the light will have two redirections (8 degrees relative to perpendicular to the plane of the device 70). This example provides an R+T of 1.70. The combination of aspect-ratio and spacing of structures described above are intended to illustrate the effects of one configuration of the device and are not intended to be the only configuration that may be designed.

Another embodiment of the device is related to uses in which light is to be directed or focused upon transmission, in particular for use in building materials where light from the sun is used to illuminate an interior area or augment artificial lighting. In this embodiment the indentations, or objects, may be angled such that the base of the indentation, or object is not parallel or coincident with the boundary of the transparent material. This embodiment will allow the light to be directed at a given angle to the transparent material independent of the angle of the light source.

One embodiment of the device may be stated as being a transflector having means for reflecting of light impingent thereon from a first direction, and having means for transmitting of light arriving from a direction opposing to said first direction wherein the sum of the percent of light being reflected relative to the light coming from the first direction, and the percent of light being transmitted relative to the amount of light coming from the opposing direction, is greater than 100 percent.

Another embodiment of the multiflector may be stated as a light transmitting material capable of transmitting light in a first and second direction, having a first surface, said first surface having reflecting means for reflecting a percentage but not all of the light striking said first surface from said first direction, and having one or more reflecting structures associated with said reflector means, said structures having sidewalls extending from said first surface, said sidewalls being at an angle sufficient to reflect light striking said structure from said second direction through said first surface such that a percentage of light from said second direction passes through said first surface, wherein the sum of the percent of light being reflected relative to the light coming from the first direction, and the percent of light being transmitted relative to the amount of light coming from said second direction is greater than 100 percent.

The device is independent of any specific system, but will typically be included as one of several elements incorporated within a system. The device will provide optimized reflection of energy in one direction while simultaneously optimizing the transmission of energy in the opposite direction. This is accomplished, for example, by utilizing high-aspect ratio structures embedded, embossed, or by other means created in the body of the device or deposited or suspended in the transmissive device. In general, by increasing the surface area of the reflecting/refracting structures in a direction from the apex of the structure to the base of the structure, the amount of energy that can reflected in one direction can be decoupled from the amount of energy transmitted in the opposite direction. In other words, the reflecting structures are formed and oriented such that they have a smaller cross-sectional area towards the transmissive side of the device and a larger cross-sectional area towards the reflective side.

Illustrated in FIG. 8A is a partial cutout perspective view of a multiflector 800 which has a light receiving side 805 and a light reflecting underside 810. The example shows three light reflecting/refracting structures 815*a*, 815*b*, 815*c* which are positioned side by side but spaced apart a selected dimension as described above. A view from the under side 810 is shown in FIG. 8B. In this embodiment, the reflective structures 815*a-c* have a shape that decrease in size towards the transmissive side 805 and increase in size towards the reflective underside 810. Although a triangular shape is shown, any shape may be used which is generally smaller at the light transmissive side 805 than at the light reflective side

810. It will be appreciated that the sidewalls of the reflective structure 815*a–c* may or may not be smooth based on a desired effect and manufacturing tolerances. Each structure 815*a–c* has an elongated body which can extend the length of the multiflector 800 or a sub-portion thereof. For example, FIG. 8C shows an embodiment where the reflective structures 815 are formed or deposited within the transmissive material 820 as smaller units uniformly distributed and oriented in the multiflector 800. Each structure 815 is shown having a square base adjacent the reflective side 810, however, any desired shape may be used as the base and the structures 815 may be oriented in any desired pattern including a random pattern. It will be appreciated that dimensions in all illustrative figures are not to scale.

The device can be placed in conjunction with other devices to produce additional effects. For example, a collimating device may be integrated with the device to form a single device, attached to the device, or incorporated into another component of a system to which the device is attached, such that the collimating device is proximal to the transmitting side of the device and between the device and the transmissive light source. The collimating device accepts incoming energy waves distributed over a broad angle and redirects the energy waves to emerge at an angle less than some specified angle as measured from the normal to the surface of the device. The use of a collimating device ensures that virtually all energy entering the device from the transmissive side will be constrained within an arc of about 10° of perpendicular to the plane of the device. Of course, a collimator with other light controlling properties can be used. Constraining transmitted energy in this manner will improve the performance of the device, but is not a requirement for the device to produce beneficial effects.

The determining factors for configuring the device are the aspect ratio of the reflecting/refracting shaped structures, spacing between structures, and materials used to construct the device. These factors determine (1) the allowable incident angle of the energy entering the device from one direction (transmissive), (2) the proportion of energy transmitted from that direction, (3) the proportion of energy reflected by the opposite side of the device, (4) the distribution of energy emerging from the device, (5) the percentage of energy lost to internal absorption or scattering. Aspect ratio (the ratio of height to base) of the reflecting/refracting shapes determines the relationship between the specific angle at which the transmitted energy enters the device and the angle at which the transmitted energy emerges from the device. The spacing between the shaped structures determines the proportion of energy reflected by the device (from the reflective side) and the distribution of transmitted energy (from the transmissive side). By increasing the spacing between the shaped structures, a smaller proportion of energy is redirected from the transmissive side while reflection of energy from the opposite direction is reduced. Conversely, by decreasing the spacing between the shaped structures, a greater proportion of the transmitted energy will be redirected while a larger proportion of the energy from the opposite direction will be reflected. The general relationship between the aspect ratio of height to base for the reflecting/refracting structures and the spacing between structures is illustrated in the following examples:

EXAMPLE 1

A single structure is triangular in cross section and extends along the full length of the device from one side to the other. The above structure is repeated at regular intervals such that one side of the entire body of the device is covered with the bases of alternating triangular rows and spaces in-between. If the specific application requirement for the device calls for approximately 66.6% of the energy from one side (the reflecting side) is to be reflected and the transmitted energy from the opposite side is restricted to emerge about 5°, than the aspect ratio must be a minimum of 11.5:1. The spacing between the shaped structures in this example will be approximately half the dimension of the base of a shaped structure. In this example the sum of potentially useful reflected energy from one side R plus the sum of potentially useful transmitted energy from the opposite side T is approximately 1.66 (R+T=1.66). This can be restated as 66.6% of the energy entering the device from the reflective side is reflected and 100% of energy entering the device from the transmissive side is transmitted (R=66.6% and T=100% so that R+T=166%).

EXAMPLE 2

Assume that the shaped structures are the same as in example 1 and that the specific application requirements call for maximizing the amount of transmitted energy independent of any specific angle of emergence. Also assume that the energy entering the device from the transmissive side is uniformly collimated within about 10° of perpendicular to the plane of the device.

In this application the requirements are for reflection of about 80% of the energy in one direction (the reflecting side) and for transmission of more than 95% of the energy from the opposite side (the transmitting side). A device having structures with an aspect ratio of 15:1 will be approximately 96.8% transmissive, assuming a perfectly reflecting material for the structures. The spacing between the structures is about one-fourth the dimension of the shaped structures. In this example the sum of potentially useful reflected energy from one side R plus the sum of potentially useful transmitted energy from the opposite side T is approximately 1.77 (R+T=1.77).

Additionally, the device can be configured to specifically control the distribution of both reflected and transmitted energy. As an example, such a configuration may be useful in a display application to improve viewing angle.

A light ray striking a triangular row of structures near the tip will have the most number of redirections before possibly exiting the device. By using basic geometry and a rudimentary understanding of geometric optics, one skilled in the art can calculate what aspect ratio and width between structures is necessary to preferably redirect light striking near the tip no more than twice before exiting. A geometric plot of the light ray path can be used to derive the relationships between the various parameters, including the constraints of the system. The height of the structure will be determined by several factors, among which is the thickness of the transparent material. If the requirement of a specific application is to transmit light through the transflector within 10 degrees of perpendicular, then assuming a height, one can plot or calculate the apex angle. The apex angle and the height will give the aspect ratio and thus the width of the base of the structure.

In non-emissive displays, the device should not exceed 100 mils thickness. The body of the device should have a transmissive co-efficient of >97%. The apex (tip) of each of the shapes penetrates into the body of the device a percentage of the total thickness between 10%–100%. Each shape will have a fixed apex angle of between 2.6°–9.5°, with an altitude to base ratio of between 6:1–22:1. In another embodiment, the shape will have a fixed apex angle of between 3.0°–7.0°, with an altitude to base ratio of between 8:1–18:1. In either embodiment, the altitude to base ratio may be as low as 4:1. This results in the walls of the structure being at an angle relative to the base of between about 83 degrees to less than 90 degrees. The base of the shape is parallel to a surface of the device and has a base width of between 2.0Φ–200.0Φ(Φ=microns). In another embodiment, the base width may be between 2.0Φ–50.0Φ. Whether the shape is created with fill material or through an optical process, the base of each structure needs to be reflective. This can be achieved either through a fill process, through a deposition/photoresist process, or other methods such as the use of overlays. The triangular row structures are periodically repeated with a fixed spacing between the apex of each triangle of between 3.0Φ–300.0Φ and the spacing between the base of each adjacent isosceles triangle is between 1.0Φ–100.0Φ. In another embodiment, the spacing between the apex may be between 3.0Φ–70.0Φ and the spacing between the bases may be between 1.0–20.0Φ. In the preferred embodiment, a collimating device is attached to the device adjacent to the transmitting side of the Multiflector device. The dimensions described in the preferred embodiment should not be interpreted as limitations since other applications may require, or allow, variations on the above specifications.

In the preferred embodiment, the cross section of a single shape is triangular and extends from one edge of the device to the opposite edge to form a single row and is oriented in the transparent material (body of the device) such that the base of the triangle is parallel to and coincident with, or slightly recessed from, the plane of one surface of the body of the device (the reflective side). In the preferred embodiment, said triangular row is repeated in parallel and evenly spaced across the entire area of the device forming a striped pattern of shapes and spaces. In other embodiments the triangular-shaped rows may be replaced by discrete objects such as pyramids, cones, or any polyhedron, and likewise may be arranged in a variety of patterns to achieve specific effects. In other embodiments, the discrete shapes, as described above, may be arranged in varying shapes, heights, angles, or spacing. In the preferred embodiment, the discrete faces of each triangular row are planar. In other embodiments one or more of the discrete faces of the row, or discrete shapes, may be concave, convex, and/or pitted. Additionally, micro-shapes (such as pyramids or cones) may be deposited on the flattened base of each structure to further control the direction of reflected energy.

In one embodiment, the material for the transparent "body" of the device will have specific properties that minimize absorption and redirection of energy—such as internal scattering. In addition, the material for the body of the device will require specific properties necessary for etching, molding, or other processes that alter the body of the device. Examples of suitable materials are polymers such as polycarbonate and PMMA (polymethylmethacrylate). Where etching, molding, or embossing is used to create a series of indentations in the body of the device, fill material such as a highly reflective metal may be used. Additionally, clear material such as a polymer, or no material (gas, air, or vacuum) may be used to fill the indentations. Where clear material or no material is used to fill the indentations, the material chosen for the body of the device should have a higher index of refraction than the fill. The minimum difference in index of refraction between the fill and the body of the device is estimated to be 0.01. In the preferred embodiment, indices of refraction are the same for each shape across the body of the device. For purposes of the present discussion, the term reflection, when discussing light striking the body of the structure, also includes refraction where the difference in the index of refraction of the materials, along with the angle of incidence, results in substantial or near total reflection of the light striking the structure.

Where the indentations are filled with a reflective material, a single material, or composite material, may be used to create the above mentioned triangular rows. The fill material for the reflective shapes will be optimized to minimize absorption and have highly reflective properties for the controlled redirection of energy. Examples of suitable materials are aluminum or silver, with a reflectivity of 95% or greater, but may be a composite paste, a composite material, or hybrid materials with different refractive indices or reflective qualities.

As described above, the reflective material may be coated on the transparent body, be part of the fill for grooves in the body, or be the base of the refracting structure physically separate from but attached to the transparent body.

A second method of creating an embodiment of the device may include producing the above-described triangular rows in a photosensitive transparent material. The desired shapes are produced by changing the index of refraction in specific areas of the body of the device. In this embodiment, a thin layer of reflective material, such as aluminum, is deposited on one side of the device, adjacent to the base of the triangular rows (reflective side). Regions of the deposition are removed corresponding to the spaces between triangular rows, creating a striped pattern across the device. Utilizing an optical process to change the index of refraction of specific areas of the device will require photosensitive materials that exhibit favorable optical and mechanical properties. In addition to a sufficient photo-induced refractive index change, a suitable set of "writing" wavelengths (typically in the ultraviolet), optical transparency, thin film formability, and mechanical behavior can be design considerations. Such materials may be organic polymers that have optimized mechanical behavior, or organic-inorganic hybrids that combine the chemical versatility of organic polymers, i.e. polysilanes, polygermanes, and/or their sol-gel hybrids.

In other embodiments related to utilizing a photosensitive transparent material, discrete shapes may be arranged in varying shapes, heights, angles, or spacing and one or more of the discrete faces of a shape, including the triangular rows, may be concave, convex, and/or pitted. Additionally, micro-shapes (such as pyramids or cones) may be deposited on one side of the body of the device directly over the base of each structure, either as part of a deposition process, described above, or as an independent process, to further control the direction of reflected energy. In other embodiments, the indices of refraction may be different for each discrete shape such that various alternating patterns are produced across the body of the device to achieve specific effects. In other embodiments, a combination of shapes created by filled indentations and altering the refractive index of a photosensitive material may be used to create various patterns across the body of the device.

Another method of creating the structures of the device is by fabrication of the structures from some suitable material that will maintain integrity in the physical working environment, and suspending the structures by some suitable method. Suspension may be accomplished by the use of wire or some type of filament that forms a grid, but will depend on the specific application and will be apparent to one skilled in the art. This aspect is useful in solar applications, where the size of transflectors are not limited by the size requirements of nonemissive displays.

One of the more common methods of collecting solar radiation is by the use of mirrors to reflect radiation from the sun onto a complex of pipes. The pipe complex may include a first pipe carrying the liquid to be heated, surrounded by a second pipe. The space between the two pipes will typically be evacuated to decrease the amount of convection and conduction loss. By mounting the device structure within this space between the pipes, the majority of solar radiation from the mirror will be trapped and reflected back onto the pipe to be heated, thus increasing overall efficiency. In most situations, the heated pipe will also be emitting radiation, which will also be trapped and reflected back. Thus solar radiation passes through the transflector, while radiation not initially absorbed by the solar collector, combined with any radiation being emitted from the solar collector due to it's temperature, is reflected back to the solar collector. In this embodiment, the vacuum is the transparent material associated with the structure.

In such solar applications, the height of the structure will only be dependent on the spacing between the pipes, and the base of the structure may be large as compared to the use in non-emissive displays. The width of the base may be 3500Φ or larger, although the smaller size structures will also be applicable to this use. The multitude of structures will preferably be bent around at least a portion of the pipe to improve both the gathering and reflection of radiation.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific detailed, the representative apparatus, and illustrative examples shown and described. Accordingly, departures may be made from such details without departing from the spirit or scope of the applicant's general inventive concept.

We claim:

1. A device having transmissive and reflective properties produced by the process comprising the steps of:
   providing a transparent photosensitive film;
   providing a reflective metal layer on a surface of the photosensitive film;
   removing the reflective metal layer in a predetermined region to expose the photosensitive film in the predetermined region; and
   changing the optical characteristics of the photosensitive film in the predetermined region to alter the index of refraction of the photosensitive film in the predetermined region to thereby form an altered refractive index area.

2. The device of claim 1, wherein an unchanged portion of the photosensitive film comprises an unaltered refractive index area.

3. The device of claim 2, wherein the altered refractive index structure has a higher index of refraction than the unaltered refractive index area.

4. The device of claim 3, wherein the ablating and changing steps occur in a plurality of predetermined regions thereby forming a plurality of altered refractive index areas.

5. The device of claim 4, wherein the unchanged portion of the photosensitive film comprises a plurality of unaltered refractive index areas.

6. The device of claim 5, wherein the unaltered refractive index areas are triangular cross-section structures each having a base, a height, and a pair of sidewalls each having an outside surface, the base is associated with said reflective metal layer, each sidewall is at an angle relative to said base.

7. The device of claim 1, wherein said reflective metal layer has a desired reflectivity percentage.

8. A device having transmissive and reflective properties produced by the process comprising the steps of:
   providing a photosensitive film having a first surface and a second surface;
   forming a photoresist layer on the first surface of the photosensitive film;
   changing the optical characteristics of the photosensitive film in a predetermined region by exposing the predetermined region of the film to a light source to alter the index of refraction of the film in the predetermined region to thereby form an altered refractive index area and to expose the photoresist layer in the predetermined region to the light source;
   removing the exposed photoresist layer in the predetermined region using a suitable etchant creating an opening;
   depositing a reflective metal layer in the opening previously occupied by the exposed photoresist layer; and
   removing the remaining photoresist layer.

9. The device of claim 8, wherein the light source is facing the second surface of the photosensitive film.

10. The device of claim 9, wherein an unchanged portion of the photosensitive film comprises an unaltered refractive index area.

11. The device of claim 10, wherein the altered refractive index area has a lower index of refraction than the unaltered refractive index area.

12. The device of claim 11, wherein the changing step occurs in a plurality of predetermined regions thereby forming a plurality of altered refractive index areas.

13. The device of claim 12, wherein the unchanged portion of the photosensitive film comprises a plurality of unaltered refractive index areas.

14. The device of claim 13, wherein the unaltered refractive index areas are triangular cross-section structures each having a base, a height, and a pair of sidewalls, the base is associated with said reflective metal layer, each sidewall is at an angle relative to said base.

15. The device of claim 8, wherein said reflective metal layer has a desired reflectivity percentage.

* * * * *